United States Patent Office.

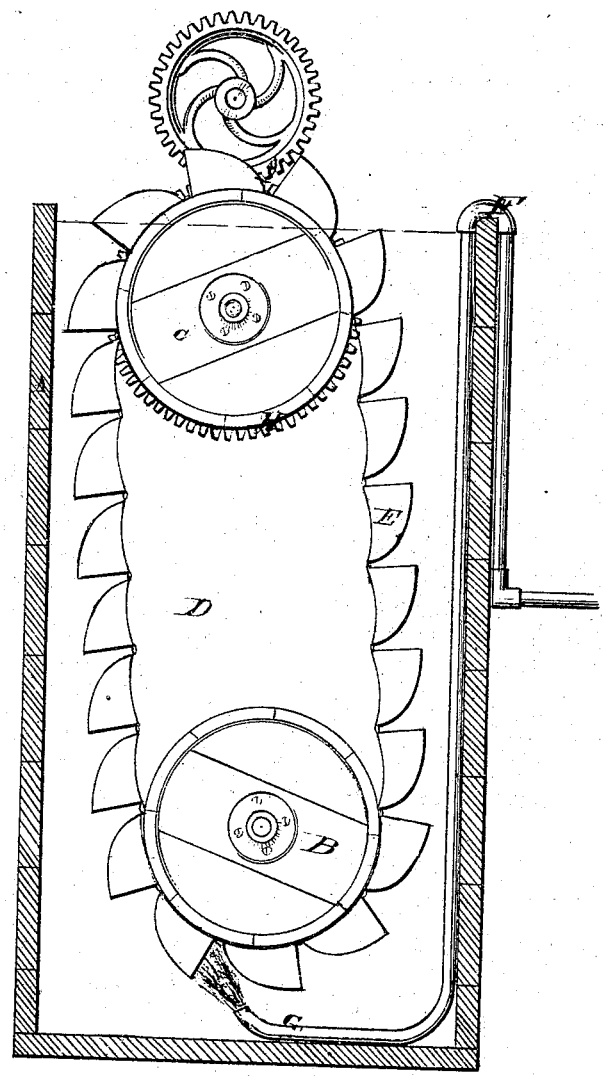

HORACE CALL, OF CONCORD, NEW HAMPSHIRE, ASSIGNOR TO HIMSELF AND J. B. RAND, OF SAME PLACE.

Letters Patent No. 98,846, dated January 18, 1870.

IMPROVEMENT IN APPARATUS FOR TRANSMITTING POWER BY THE MEDIUM OF AIR.

The Schedule referred to in these Letters Patent and making part of the same.

*Know all men by these presents:*

That I, HORACE CALL, of Concord, in the county of Merrimack, and State of New Hampshire, have invented certain new and useful Improvements in Transmitting Power; and I do hereby declare the following to be a full description of the same, reference being had to the annexed drawings as forming a part of this specification, in which—

Figure 1 represents a side vertical section of the apparatus for receiving the power transmitted, which consists of a tank, A, in which is placed, in its bearings, near the bottom of the tank, a wheel or drum, shown by letter B, and another wheel or drum, in its bearings, near the top of the tank, shown by letter C. Around these two drums is extended an endless apron, shown by letter D, and to each segment of the apron is fastened a bucket, shaped like the buckets of a water-wheel, one of which is shown by letter E. An air-supplying pipe is extended into the tank from the top, shown by letter F, which is to discharge air under the inverted sides of the buckets, under the bottom of the lower wheel, a little to the left of the centre, as shown by letter G. The tank is to be filled with water, and the wheels and endless apron are fully immersed in water, and as air is discharged under water from the end of the pipe, it has a tendency to gain the surface with a force equivalent to the weight of water in the buckets which will be displaced by the air, and the endless apron and wheels around which the apron extends are made to revolve.

The gearing H, around the end of the top wheel, is connected with a pinion-cog wheel, shown by letter I, from which motion and power are conveyed to machinery.

The nature of my invention consists in transmitting power from one point or place to another, by means of forcing air from the point where the power is generated, through a pipe, to the place where I wish to make use of the power, or to several places at the same time, by means of side or branch-pipes.

In carrying out my invention, if the power is taken from a water-wheel, I drive with the wheel one or more air-compressers or force-pumps, of sufficient size to consume the power the water-wheel is capable of yielding, connecting, with the pumps or air-compressers, a pipe, having suitable valves, which I extend to the place of destination, entering the tank from the top and extending it to the bottom, so as to discharge the air under the inverted side of the buckets attached to the segments of the endless apron, as shown by letter G.

The pipe is to be of sufficient size to convey the air to be transmitted, and may be made of lead, iron, leather, cement, or any other substance or material that will not allow the air to escape when passing through it.

The tank may be made of wood or iron, or a cemented pit in the ground under the building, and should be made large enough to contain the apparatus which is to receive the power transmitted.

The segments of the endless apron may be made of wood or iron, and are to be securely fastened to each other by iron links or their equivalents.

To each segment is fastened a curved or inclined bucket, similar in shape to the buckets of a water-wheel.

The buckets may be made of wood, or to suit convenience.

The inside of each segment is provided with projecting clutches, which fit into grooves made in each wheel, for the purpose of connecting the apron with the wheels, and keeping it in its proper position on the wheels when revolving around them.

The pipe leading into the tank is so placed as to discharge the air under the buckets at the bottom of the lower wheel, a little in front of its centre, under the inverted side of the buckets.

The wheel or pulley at the top, around which the endless apron passes, is stationed in its bearings a little forward from a perpendicular line with the one at the bottom; and as it is a natural law for air to rise perpendicular when discharged under water, and when it meets with obstructions in its ascent to the surface, it will rise as near perpendicular as the obstructions which it meets with will admit of, consequently, the air will enter the first bucket beyond the end of the pipe where it is discharged. The water will immediately drop down out of the bucket, the lighter fluid taking the place of the heavier; and as soon as the first bucket is filled with air, it rises above the first bucket, and enters under the edge of the second, and continues to fill each bucket with air to the top.

The best chance the air has to rise perpendicular, is to fill each bucket in its ascent, the edge of which is a little in front of a perpendicular line to the next one below it.

The air which displaces the water from the buckets will press up the same number of pounds which the water would weigh that was displaced by the air. At the same time the buckets on the opposite side of the apron are filled with water, and press down on that side, and thus the endless apron and wheels are made to revolve; and as each bucket, in its revolution, rises to a point a little past the centre, at the top of the wheel, where the air escapes, it is immediately filled with water again, for the buckets should always be fully immersed in water when in operation, otherwise the air cannot be fully controlled to answer the end designed.

I do not claim the whole of the principle specified in this application to be new, I having referred to and stated this to be one of the methods which could be used for receiving the air and applying the power transmitted instead of an overshot water-wheel named in the claim in Letters Patent, No. 93,964, an invention made by me; and although this arrangement embraces the same principle, yet, it being a different combination, it could not well have been incorporated in the claim in my former patent above referred to, this being subject for another patent; but I herewith specify, declare, and make oath to the fact, that twenty-eight years ago an occurrence took place which led me to conceive the principle of transmitting power by the medium of air, substantially as set forth in this and the specification of my Letters Patent, No. 93,964; and though I have always intended, since I first conceived the idea, to develop the principle, and secure patents for the same, yet I have neglected to do so until within a year past. The first model I ever made to test the correctness of my theory, worked, as I first supposed it would, with entire success.

In my Letters Patent, No. 93,964, before referred to, it will be seen that I discharge the air through a pipe into a tank containing a wheel, made similar in shape to an overshot water-wheel, at the bottom of the wheel, a little in front of the centre, under the inverted side of the buckets attached to the periphery of the wheel; and as air discharged under water, in all cases, rises perpendicular, if it has a chance to do so, it will be seen that the pressure up is applied to the buckets of the wheel in such a manner as not to do near as much work from six to eight and from ten to meridian, and a little past meridian, where the air escapes, (using the dial of a clock for illustration, which is sometimes done by millwrights,) as is done by the buckets from eight to ten, for in that part of the wheel the air has a chance to do the most part of the work in turning the wheel; but in this arrangement, the endless apron, standing nearly perpendicular, and the pressure up being the same on all the buckets, at the same time, on the side of the apron where the buckets are filled with air, and the weight of the water down in the buckets on the opposite side being also nearly perpendicular, therefore I think I receive a greater amount of power by which to drive machinery from the same amount of air discharged than by the process claimed in my first patent.

I find that air is but slightly compressed in its passage through the pipe, from the starting-point to the point of discharge, there being nothing to resist its passage but the weight of water in that portion of the pipe which enters the tank at the top; and from the elastic nature of air itself, it supplies a very steady and even motion for driving machinery, which I find to be the case in using the machine I now have in operation in my mill at Bow; and though some loss is sustained, in the process of transmission, by friction and otherwise, yet I am satisfied it is not large enough to materially affect the utility or value of the process.

The power transmitted may be obtained from water, steam, or any other source from which motive-power is derived, and may also be forced through the pipes by hydraulic pressure or circular fan-blowers, instead of air-compressers or force-pumps.

There are many valuable water-powers, some less than a mile and some of them one or more miles from popular cities in our country, which, from their locality, are now running to waste. We cannot move our cities to where these water-powers are located, but by this process, these powers can be transmitted through one or more main pipes, by one or more air-compressers or force-pumps, and by branch-pipes can be carried to different workshops, though they may be located at elevated points from where the power is obtained; and if the tank is placed in a room containing greasy machinery, filling it with impure air, this process will not only furnish power, but pure air also, for a volume of air will be constantly escaping into the room, having been cleansed and purified by the water through which it has risen, and thus ventilate the building.

This process must also be of great value in point of fire-risk in our large cities, for instead of running one hundred steam-engines of the capacity of ten-horse power each, at one hundred different workshops, with the expense of engine, fuel, engineer, and fireman for each shop, one steam-engine, of a thousand-horse power, placed where it will not endanger any buildings except the one it shall occupy, will supply the place of the one hundred engines, dispensing with their firemen, engineers, and engines, and the fire-risk arising from them; and for mining-purposes, the air can be driven into the mine through a leather hose-pipe, supplying the miners with power and the best of ventilation.

On many streams of water where mills are now built, there is not water enough secured by the dam at that point to supply the amount of power needed, but if one or more dams can be built above or below the mill, other wheels can be driven by them, and the capacity of the stream can be repeated as often as there is a chance to build a dam across it, and the power realized from them can all be concentrated in the mill, and used, like hitching more horses on to the team; or, if it is more desirable to locate a mill on a more elevated place, the power that can be received from a series of dams may all be concentrated there.

Having described my invention,

What I desire to secure by Letters Patent, is—

The combination and arrangement of an endless apron, D, having straight or curved buckets attached to its segments, and the wheels B and C, around which the endless apron, with the wheels, revolves when placed in its position under water, in an enclosing cistern or tank, A, and a pipe, F, entering the tank at the top, and descending to the bottom, from which air is discharged to enter into and displace the water from the buckets, by the pressure upward, and cause the apron and wheels to revolve, the wheels C having suitable gearing for connecting it with other gear-wheels and machinery it is to drive, all substantially as shown and described in the specification.

HORACE CALL. [L. S.]

Witnesses:
J. B. RAND,
J. E. LANG.